May 4, 1926. Re. 16,343

A. L. POWELL

TRANSMISSION FOR ENGINES

Original Filed Dec. 8, 1920 11 Sheets-Sheet 1

Inventor

Allen L. Powell

May 4, 1926. Re. 16,343

A. L. POWELL

TRANSMISSION FOR ENGINES

Original Filed Dec. 8, 1920 11 Sheets-Sheet 2

Inventor

Alva L. Powell

May 4, 1926. Re. 16,343

A. L. POWELL

TRANSMISSION FOR ENGINES

Original Filed Dec. 8, 1920 11 Sheets-Sheet 3

Inventor

Allan L. Powell

May 4, 1926. Re. 16,343
A. L. POWELL
TRANSMISSION FOR ENGINES
Original Filed Dec. 8, 1920 11 Sheets-Sheet 4
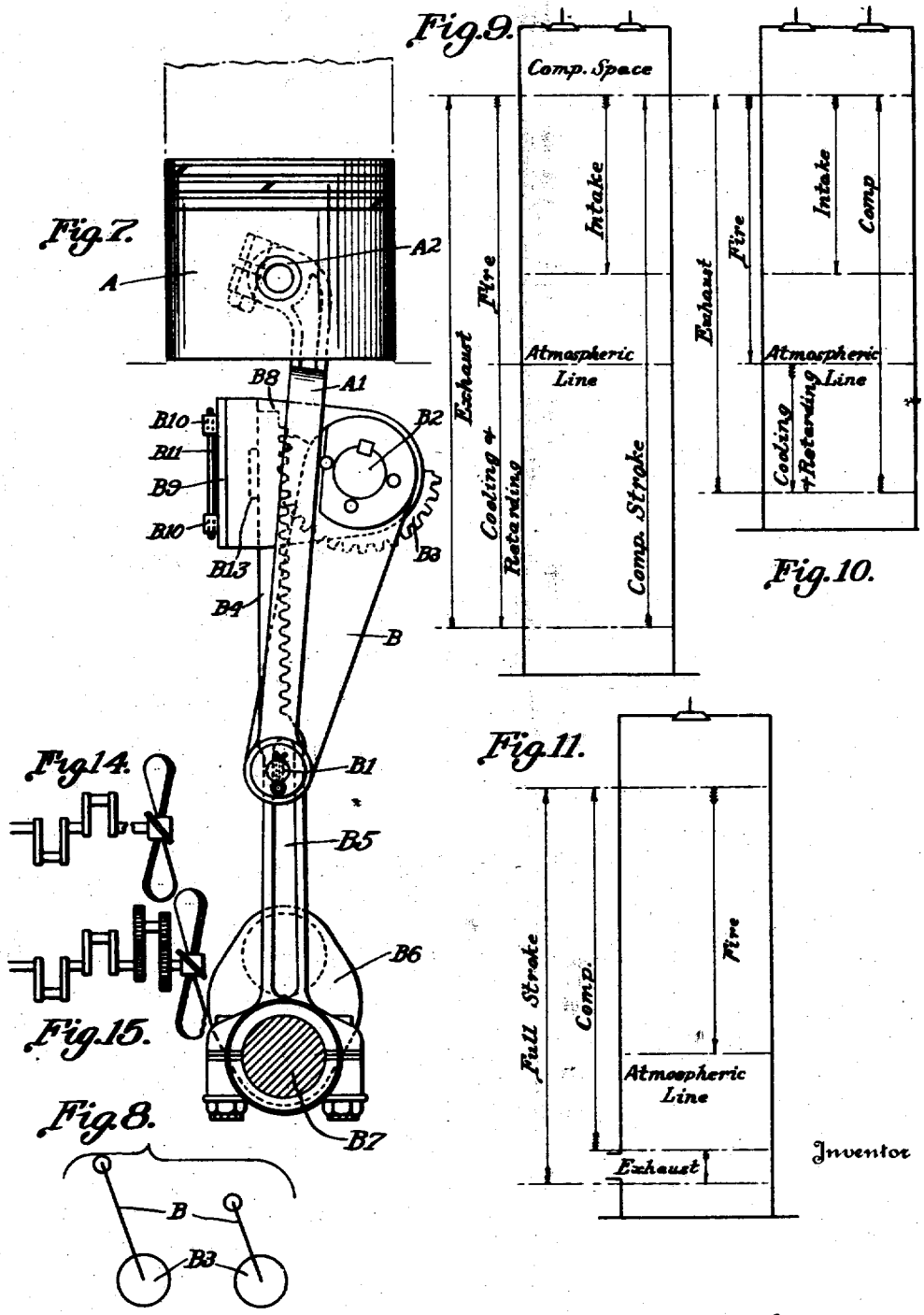
Inventor
A. L. Powell May 4, 1926. Re. 16,343
A. L. POWELL
TRANSMISSION FOR ENGINES
Original Filed Dec. 8, 1920 11 Sheets-Sheet 5
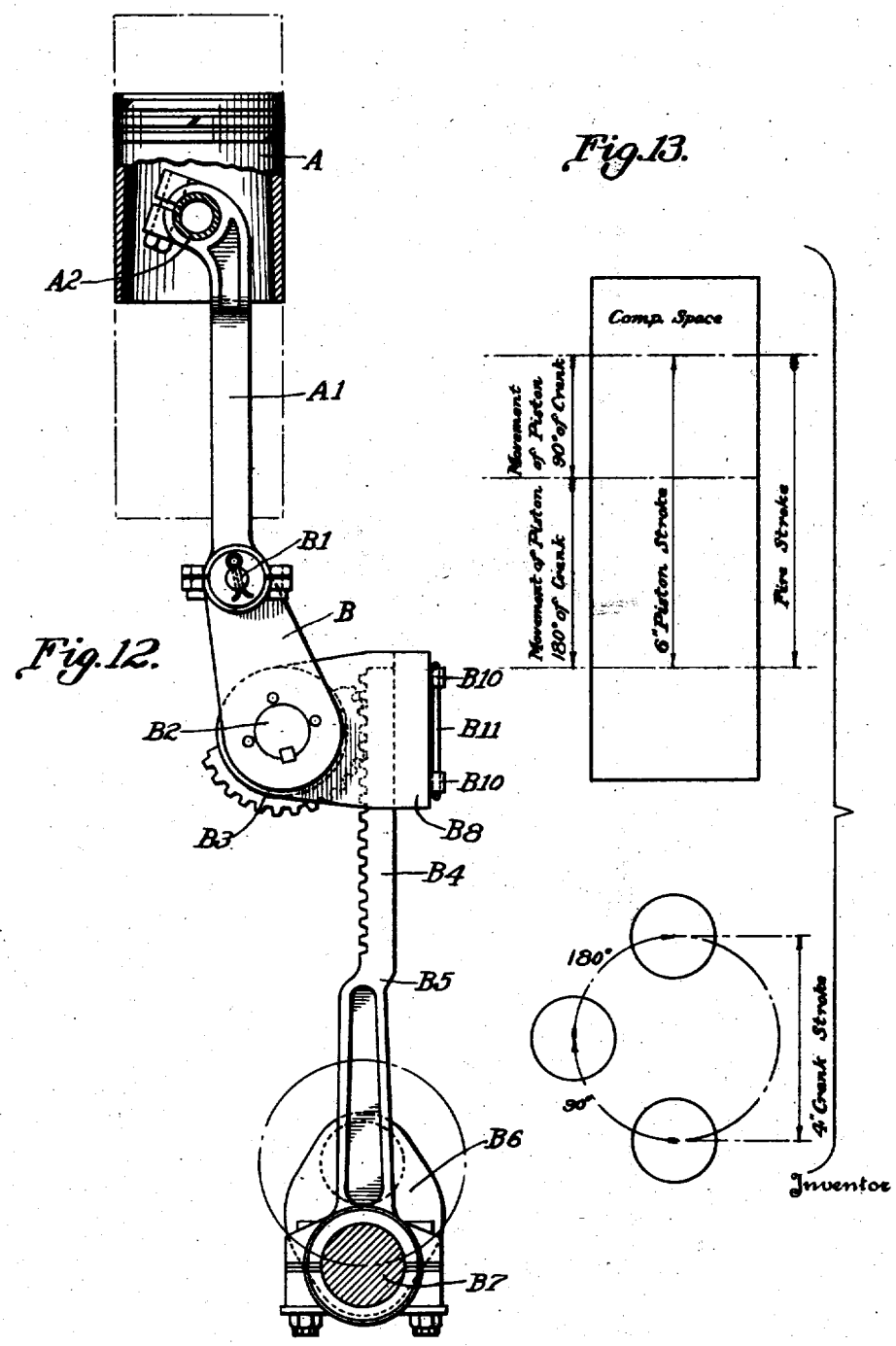
Alvah L. Powell May 4, 1926. Re. 16,343

A. L. POWELL

TRANSMISSION FOR ENGINES

Original Filed Dec. 8, 1920 11 Sheets-Sheet 6

May 4, 1926. Re. 16,343

A. L. POWELL

TRANSMISSION FOR ENGINES

Original Filed Dec. 8, 1920 11 Sheets-Sheet 7

Inventor

Arch L. Powell

May 4, 1926. Re. 16,343

A. L. POWELL

TRANSMISSION FOR ENGINES

Original Filed Dec. 8, 1920 11 Sheets-Sheet 8

Inventor

Allan L. Powell

May 4, 1926. Re. 16,343

A. L. POWELL

TRANSMISSION FOR ENGINES

Original Filed Dec. 8, 1920 11 Sheets-Sheet 9

Inventor

Alvah L. Powell

May 4, 1926. Re. 16,343

A. L. POWELL

TRANSMISSION FOR ENGINES

Original Filed Dec. 8, 1920 11 Sheets-Sheet 10

Alvah L. Powell

May 4, 1926. Re. 16,343

A. L. POWELL

TRANSMISSION FOR ENGINES

Original Filed Dec. 8, 1920 11 Sheets-Sheet 11

Inventor

Alvah L. Powell

Reissued May 4, 1926. Re. 16,343

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

Original No. 1,384,335, dated July 12, 1921, Serial No. 429,168, filed December 8, 1920. Application for reissue filed March 16, 1923. Serial No. 625,671.

DIVISION A.

*To all whom it may concern:*

Be it known that I, ALVAH L. POWELL, a citizen of the United States, residing at Miles City, in the county of Custer and State of Montana. have invented certain new and useful Improvements in Transmission for Engines, of which the following is a specification.

I am filing on this day application No. 625,672 which is a division of this case.

It has been known for many years that a long piston stroke is highly desirable in an internal combustion engine. However it was not practicable to materially increase the size of an automobile engine. In automobiles of ordinary construction the diameter of the crank circle is exactly equal to the distance through which the piston moves. It would therefore be necessary to increase the height of the engine two inches for each additional inch of the radius of the crank circle.

My invention relates to improvements in the transmitting members of engines whereby it is possible to increase the piston travel without a proportional increase in the dimensions of the engine or motor.

It has furthermore been a fact of common knowledge that it would be desirable to decrease the enormous number of explosions in the explosive chamber of an automobile engine. My invention makes it possible to materially decrease the number of these explosions without diminishing the power output.

Incidentally my invention by diminishing the number of explosions diminishes the overheating of the engine and thereby saves much oil and either diminishes or eliminates many injurious results among which might be mentioned back-firing and the loss of energy through radiation of the heat of the overheated engine.

Engineers are agreed that a long piston stroke would allow a more complete burning of the explosive gases in an automobile engine and as a result a large part of the power which now escapes in the exhaust is utilized when my improvement is incorporated in the engine structure. Likewise it is advantageous to have a long stroke in a steam engine so that the maximum expansion of the steam may be possible. In either an explosive engine or a steam engine my improvement saves much power which is now wasted.

My invention relates to improvements in the transmitting members of engines by which I establish any desired relation between the piston travel and the diameter of the crank circle which enables me to obtain advantages in the operation of such engines that are impossible with the construction at present used. My improvement incorporates a lever between the piston and the crank rod which establishes any desired relation between the piston travel and the diameter of the crank circle so that, while this piston may move, say, six inches, the diameter of the crank circle will be only four.

The lever to which I refer is, therefore, a means for reducing the engine speed, the additional force developed in the longer stroke of the piston enabling the mechanism to transmit greater power to the crank than is obtained in engines of ordinary construction. In general, it is desirable, that heat engines reach their theoretical power at a minimum speed. Certain very useful types of these engines are handicapped by the great number of revolutions per minute necessary to develop the power for which they were designed. In the explosion engine in particular, that is, those in which air and gaseous vapor are mixed and ignited, high speed is the rule. In my invention I am able to reduce this; the additional cylinder space and consequent increase of piston stroke lengthening the interval of movement with reference to time, thus effecting a slowing down of the engine without reducing power.

In all engines intended for high duty this is desirable. Marine engines of the explosion class transmit power to the driving shaft through systems of costly gearing which involve greater friction than occurs in the direct connecting gear of reciprocating steam engines. This greater friction is an essential defect in all such power machines.

By using the additional working area in the cylinder I am able to produce a further expansion of the charge, with a consequent increase of thermal efficiency, or I may increase the volume of the charge and power of the engine at the same time, securing from it the working advantages of an engine of, say, six inch stroke, restricted to a crank circle of four inches diameter thus raising the torque of the engine shaft. To go further, I may utilize this extra part of the stroke as a cooling means, as hereinafter to be described. In engine design this relation of piston stroke to crank stroke effects a reduction of cylinder surface, with reference to crank power, of great importance to the designer, as a minimum of radiation surface for a given horse-power is made possible.

Many modifications of the lever principle I employ are possible, but I have confined my description to a specific form, embraced in the drawings annexed, but I include in the views covered by the drawings some modifications of the main design, and some applications of my invention to standard types of engines.

Figure 3:
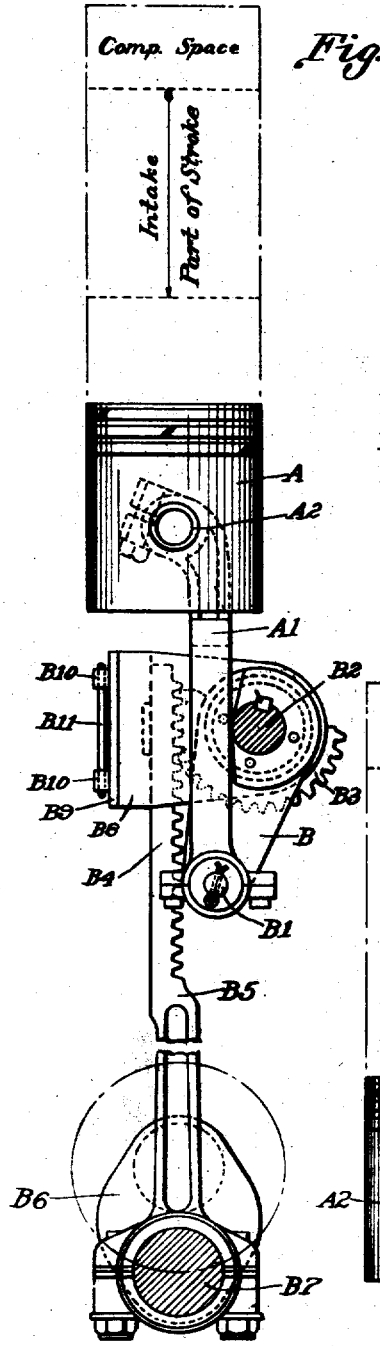
Figure 3 is the same at half stroke.

Figure 3ª is a diagram showing the various movements involved.

Figure 4:
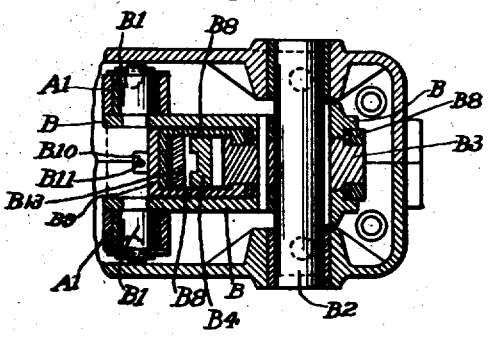

Figure 4 is a transverse sectional view of the lever mechanism.

Figure 5:
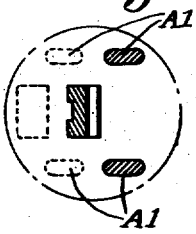
Figure 3A:
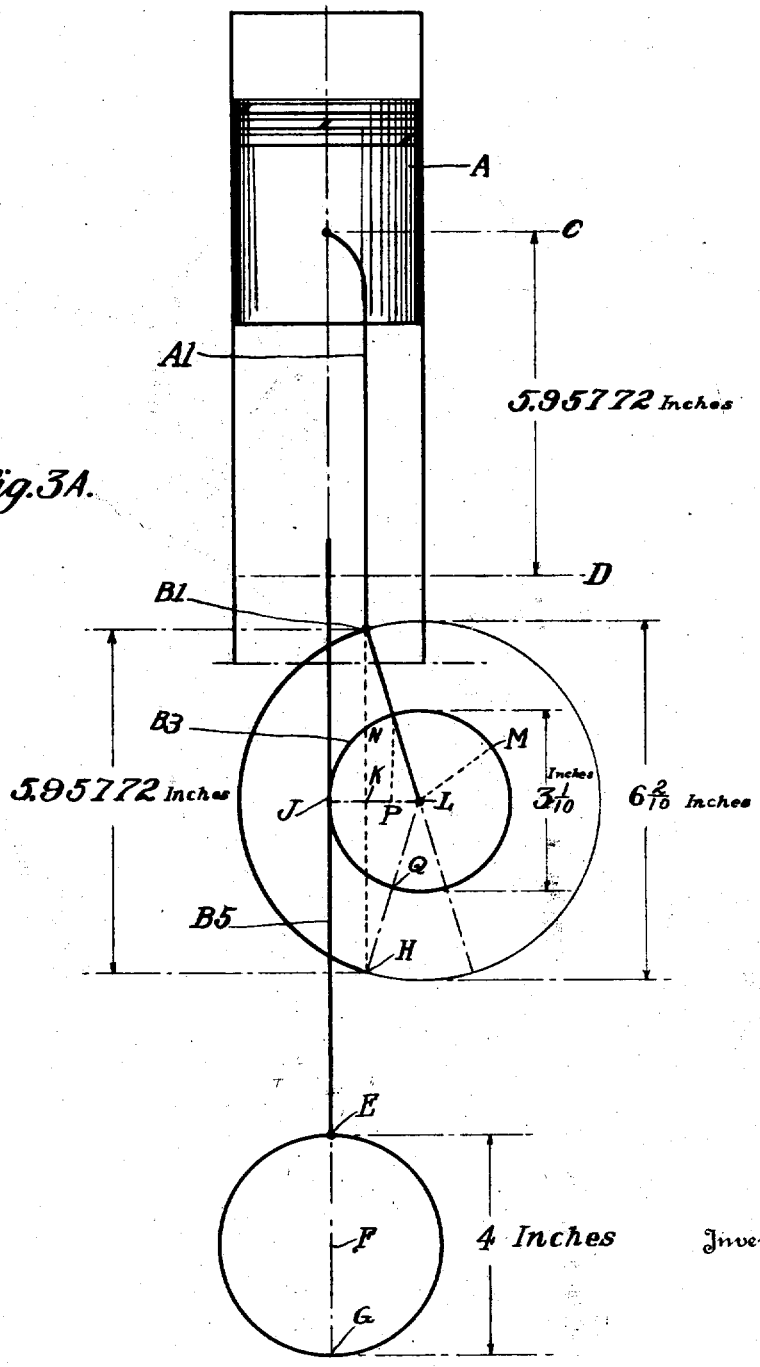

Figure 5 shows, in section, the variation in position of the connecting rod rack.

Figure 6:
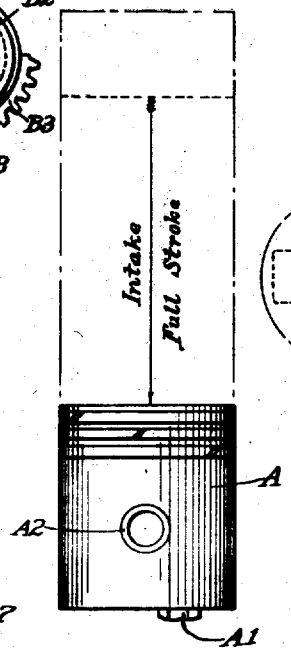

Figure 6 is a diagram of the intake, at full stroke.

Figure 7 is an elevation of a modification of the lever mechanism, showing piston at end of downstroke.

Figure 8 is a diagram to show that the leverage may be varied to secure any desired stroke of the piston or throw of the crank shaft.

Figure 9 is a diagram of the power cycle, where the additional area of the stroke is used for a cooling and retarding means.

Figure 10 is another diagram, to accompany Figure 9.

Figure 11 is a diagram of a two cycle engine, embracing my variable stroke.

Figure 12 is an elevation, showing a modification in the arrangement of the crank shaft with reference to the engine cylinder.

Figure 13 is a diagram of the relation of the piston movement to that of the crank, and shows the full stroke when it is used for maximum power on the crank shaft.

Figures 14 and 15 show a method of connecting the engine for high and low power.

Figure 16:
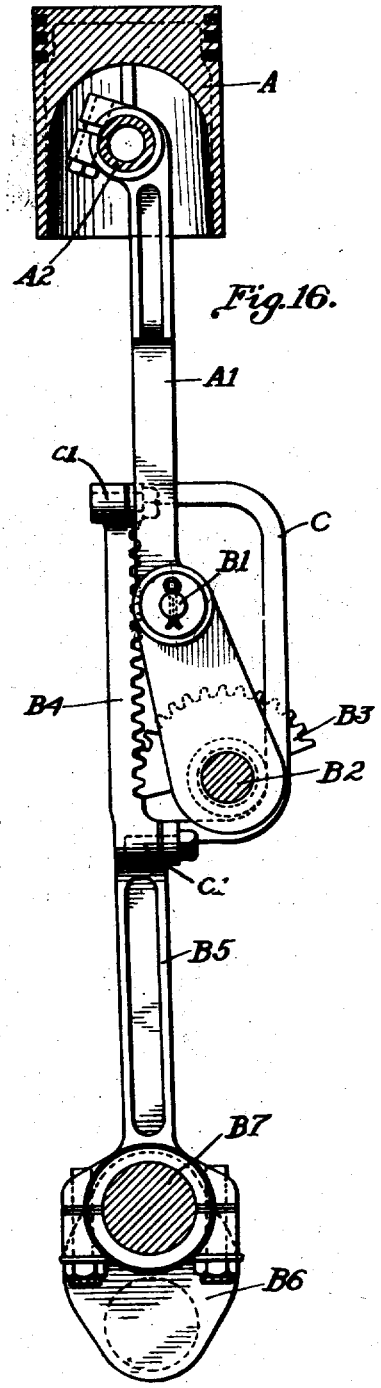

Figure 16 is a view in elevation showing a modification in the construction of the lever mechanism.

Figure 17:
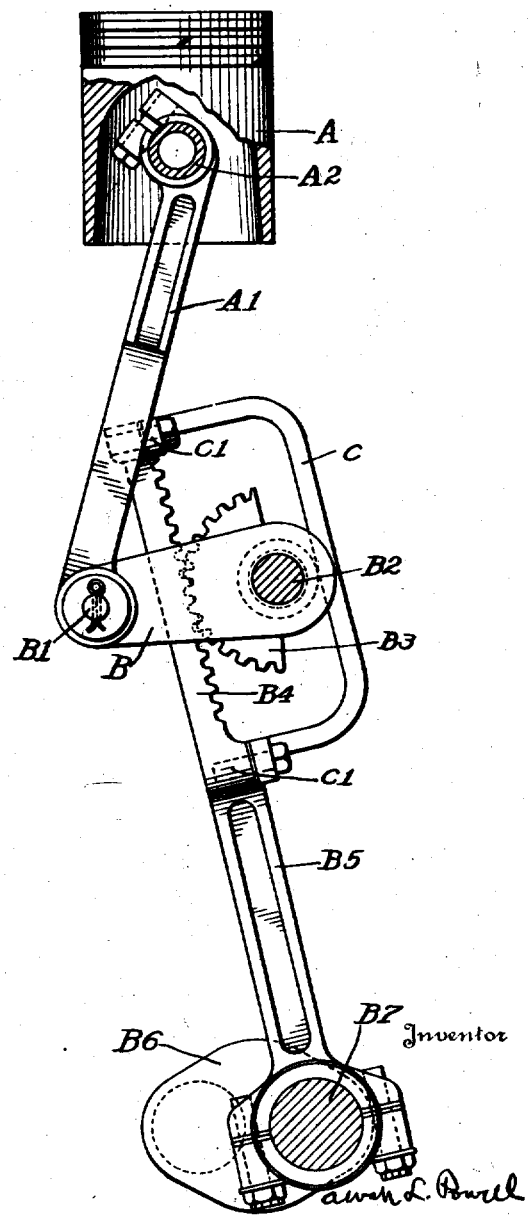

Figure 17 shows the parts shown in Figure 16 in another part of the stroke.

Figure 18:
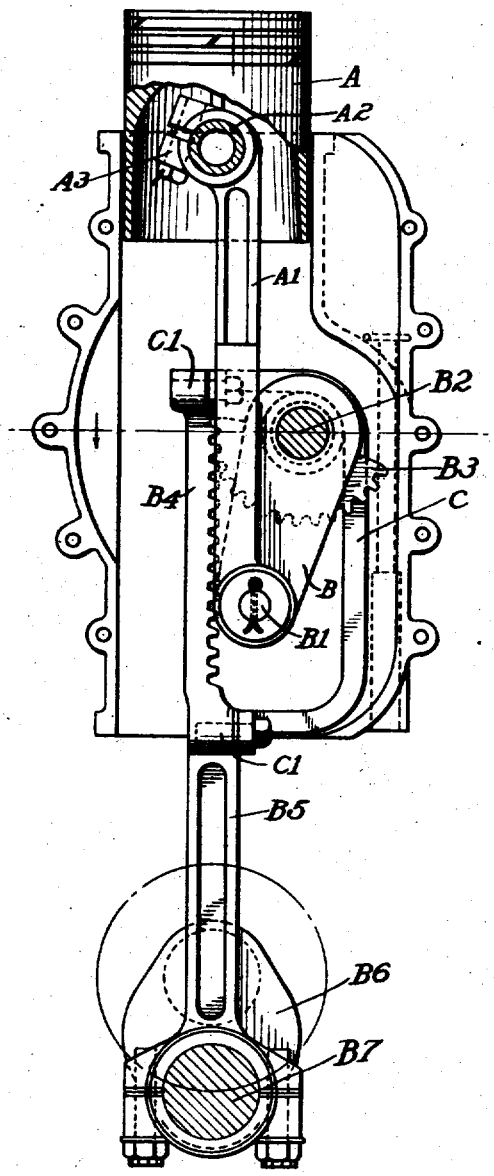

Figure 18 is the same, at end of stroke.

Figure 19:
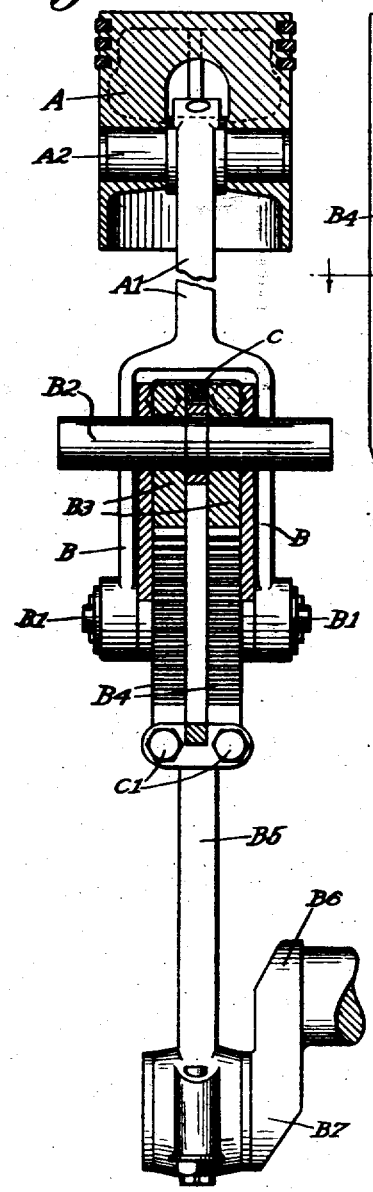

Figure 19 is a longitudinal section of the same, the parts being shown in elevation.

Figure 20:
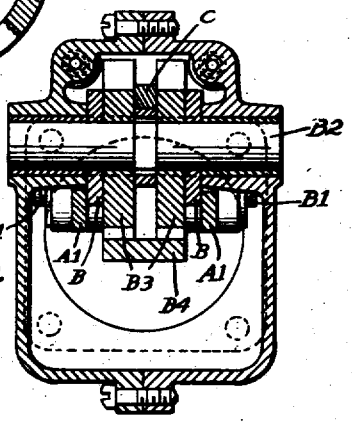

Figure 20 is a transverse section on the line *a—a*, Figure 18.

Figure 21:
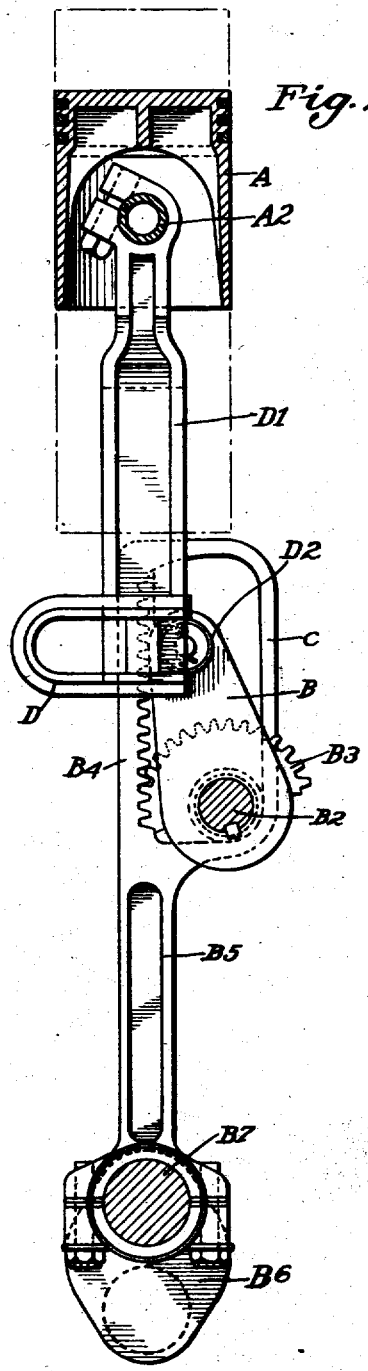

Figure 21 shows a modification of the construction given in Figures 16 to 20, inclusive.

Figure 22:
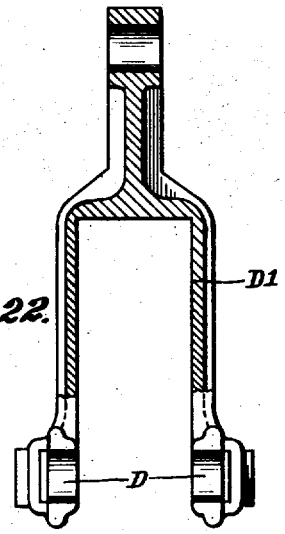

Figure 22 is a longitudinal section of the piston rod shown in Figure 21.

Figure 23:
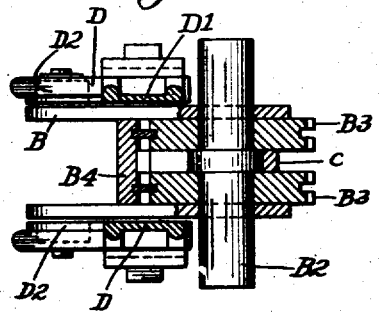

Figure 23 is a transverse section of the same.

Figure 24:
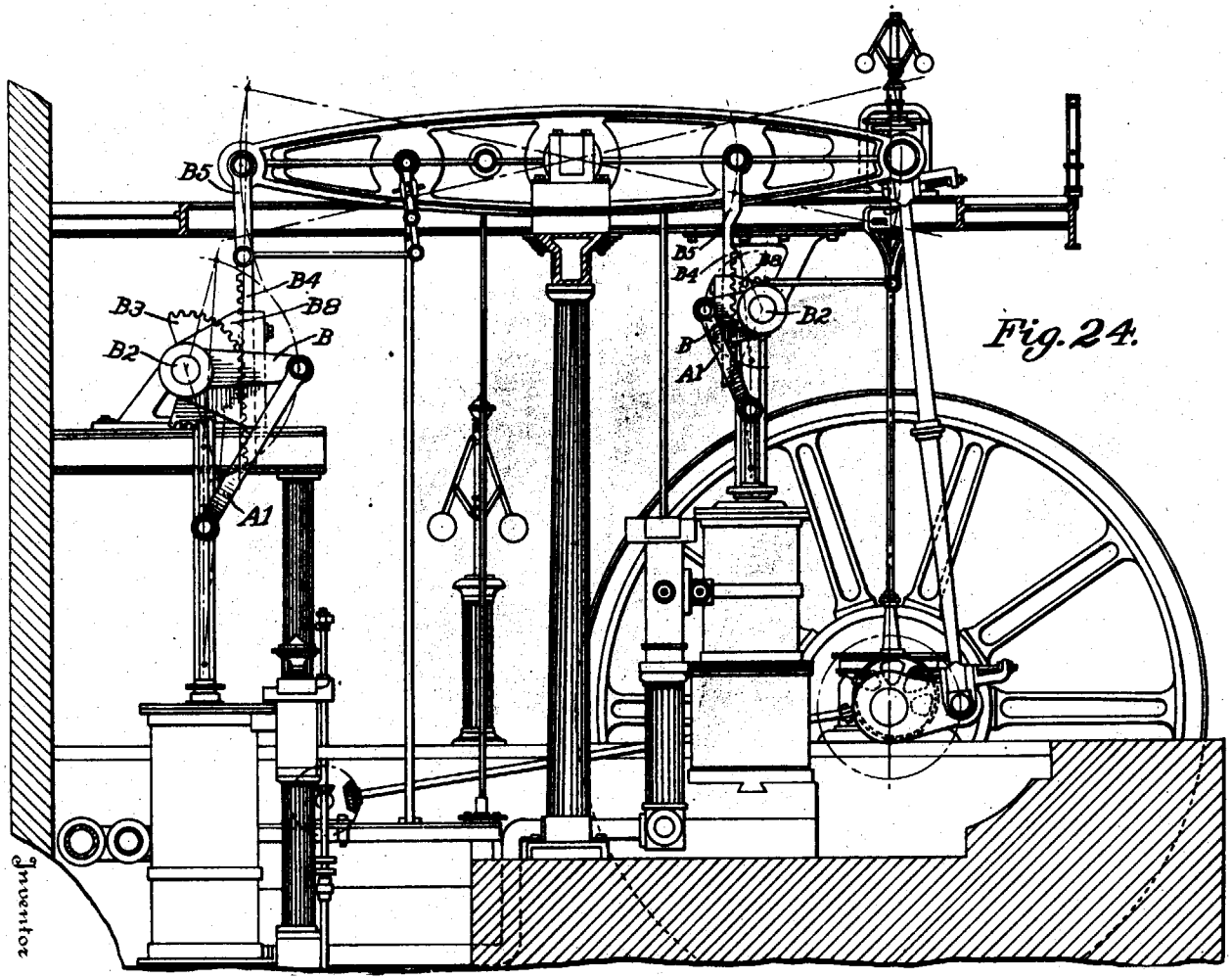

Figure 24 shows an application of my invention to a walking beam steam engine.

Figures 25, 29, 30:
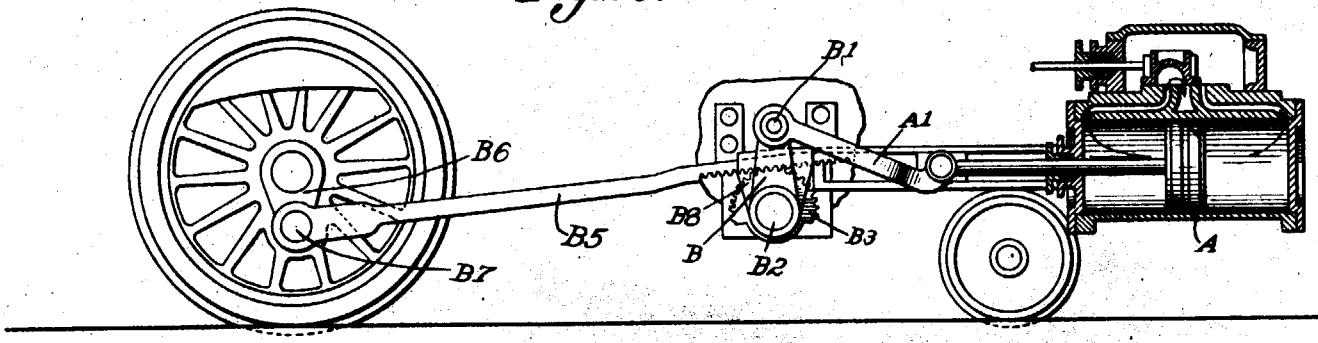

Figure 25 represents my lever mechanism attached to the driving gear of a steam locomotive.

Figure 26:
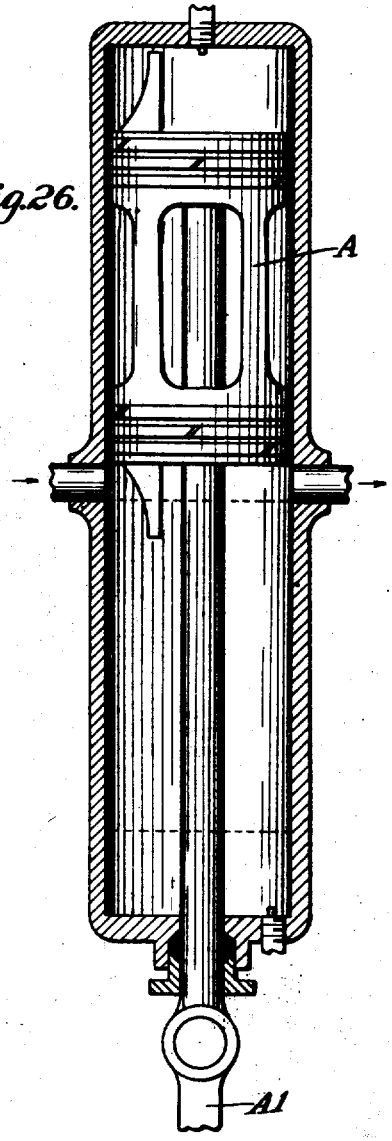

Figure 26 represents the cylinder and pistons of a two cycle engine of the double action class, to indicate that my improvement may be applied to such engines, deriving the advantage of power on both sides of the piston.

Figure 27:
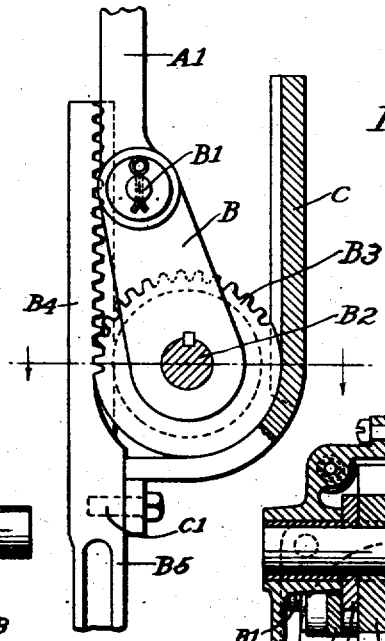

Figure 27 is a further modification of the yoke-supported rack form of my improvement.

Figure 28:
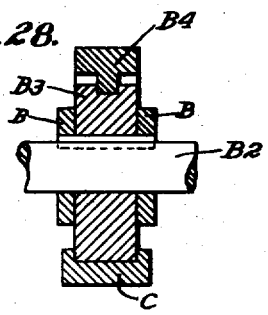

Figure 28 is a sectional view, on the dotted line (Fig. 27) shown with arrows.

Figures 29 and 30 are diagrammatic, showing the relative proportions of steam cylinders as affected by the long stroke of my transmission member. Figure 29 shows the conventional type and Figure 30 shows my type.

Figure 1:
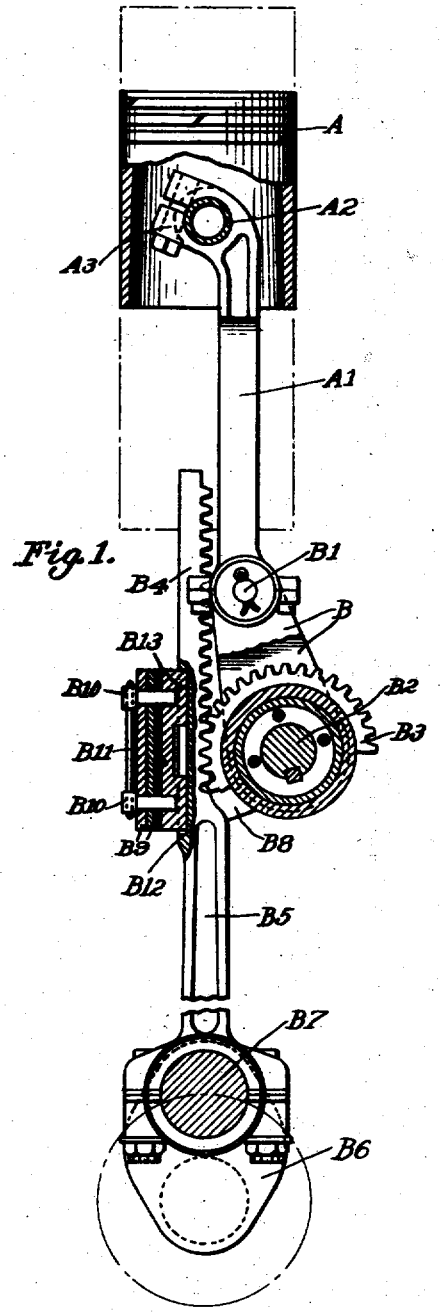
Figure 1 is an elevation, partly in section, of the variable movement lever, showing it in connection with a cylinder and crank shaft.

In Figure 1 the piston A of a gas engine transmits motion through the piston rods, or links, $A^1$, $A^1$, mounted on a pin, $A^2$, that passes through the piston walls. These links are held on the pin by means of the bolt shown, and a bushing, $A^3$, is employed to allow for wear. The links $A^1$, $A^1$, connect with crank levers, B, B, by means of pins shown at $B^1$. The crank levers, B, B, are attached to a pin, $B^2$, suitably supported in the engine frame. On the same pin there is a segmental pinion $B^3$; this pinion and the crank levers B, B, being keyed to the pin $B^2$. The segmental pinion $B^3$ engages a rack, $B^4$ that forms part of a connecting rod $B^5$. The connecting rod is attached to the shaft crank $B^6$, by a wrist pin $B^7$, the construction being conventional. On the pin $B^2$ there are also swung two arms, $B^8$ which form a support for a slide bearing in which the connecting rod $B^5$, moves. The arms $B^8$ are journaled on the pin $B^2$ in order to allow free movement with reference to the motion of the connecting rod, $B^5$. To give proper support to the rod $B^5$ the arms $B^8$, $B^8$ are provided with a tongue sliding surface, $B^{13}$, held in position by a cap, $B^9$, and the tap bolts, $B^{10}$, $B^{10}$.

Proper wearing surfaces on the rod $B^5$ are provided at $B^{12}$, a free sliding groove for said rod being thus furnished. A sectional view of this construction is given in Figure 4. Under the conditions described it is evident that on the outstroke of the piston the lever B swings in an arc downward, rotating the pin $B^2$, and causing the segmental pinion to transmit movement to the toothed connecting rod, $B^5$. This rod rotates the shaft crank, $B^6$, thus transmitting the power developed in the engine cylinder to the engine shaft. The connecting rod moves in the guiding and retaining means provided by the capped arms, $B^8$, $B^8$ and, the reciprocating motion of the said piston is converted into a movement of rotation at the crank circle. It will be noted, however, that the lever B is attached to the piston links $A^1$—$A^1$ at a point such that the effective length of the lever B is greater than the radius of the pinion $B^3$. As shown in Figure 1, the ratio of lengths of the lever B to the radius of the segmental pinion $B^3$ is approximately two; and the movement of the outer end $B^1$ of the said lever B will be greater than that of the engine piston A, from which it derives its motion. Power will be transmitted to the crank $B^6$ by the racked connecting rod $B^5$, from the segmental pinion $B^3$.

Referring to Fig. $3^A$ the length of arc QJN is equal to EG, the vertical distance through which any point on the racked rod moves. Denote by $\frac{1}{r}$ the ratio of the short arm LN to the long arm $LB^1$ of the lever $LB^1$. Then the distance PN equals $$\frac{B^1H}{2r},$$

and $$\frac{B^1H}{2rLN}$$

equals sine ($JLB^1$); and half the arc QJN, or JN equals EF, and $$\frac{EF}{LN}$$

equals (angle) $JLB^1$ (circular measure) This is $$\frac{EF}{LN}\times\frac{2rLN}{B^1H} \text{ equals (angle) } \frac{JLB^1}{\text{sine } (JLB^1)};$$

cancelling, $$\frac{2rEF}{B^1H} \text{ equals (angle) } \frac{JLB^1}{\text{sine } (JLB^1)} \text{ (circular measure)}$$

And $$LN \text{ equals } \frac{EF}{\text{(angle) } JLB^1} \text{ (circular measure)}$$

That is, twice the leverage ratio multiplied by the crank throw (in inches) and divided by the piston stroke (in inches) equals the circular measure of half the angle of oscillation divided by its sine; and the short arm of the lever (in inches) equals the crank throw (in inches) divided by the circular measure of said half angle. The expression $$\text{angle } \frac{JLB^1 \text{ (circular measure)}}{\text{sine } (JLB^1}$$

may be solved by the "cut and try" method, three trials usually sufficing for the solution.

Thus of the four essential elements, crank throw, piston travel, length of lever and ratio of short to long arm, any one may be determined when the remaining three are given. These formulas may be expressed in the following form:

$$B^1H \text{ equals } 2(B^1L) \text{ cosine}\left[90^\circ\left(1-\frac{EG}{\pi(LN)}\right)\right]$$

In my preferred construction I contemplate using a crank having a throw of two inches, a pinion having a radius of 1.55 inches and a lever having a length of 3.1 inches. The piston travel may then be computed the last mentioned formula. Evaluating:—

$$B^1H \text{ equals } 2\times3.1 \text{ cosine}\left[90^\circ\left(1-\frac{4}{3.1416\times1.55}\right)\right]$$

equals $2\times3.1$ cosine 16° 4 minutes 12 seconds
equals 5.95773 inches, a value so nearly equal to six inches that the difference is immaterial.

With my improved construction it is possible to have a piston stroke of six inches and a crank diameter of four inches, the lower end of the pitman $A^1$ traveling eight inches around the arc $B^1H$, a point on the pitch circle of the pinion $B^3$ traveling four inches on the arc MNJ and the angle movement $B^1LH$ of the crank lever B being the same as the angular movement MLJ of the pinion $B^3$, each angle being 147° 51′ 36″.

The force developed in a long stroke is in this way compounded into the shorter stroke of a suitably connected crank, the effect being a leverage that gives the advantage of a six inch working piston stroke while using a four inch stroke of the working crank. I thus gear the piston movement to increase the force at the crank, the leverage means employed being composed of members of the transmitting means. These means are of a practical and effective form, adapted to long wear, and are simple with reference to structure.

Considering the crank as the short end of this compound lever and the primary moving element as the long end the circular motion of the short end will be approximately equal to the longer motion of the long end.

It is evident that in an engine cylinder the duration of piston stroke is a variable quantity, for as the length increases the time of travel increases, other factors being equal. The speed of shaft rotation will therefore be less in an engine of long stroke than in one of short stroke, compression and back pressure remaining the same, but the transmitted power will correspond to the force developed during the piston stroke. Under these conditions this engine will deliver a given h. p. with a cylinder of given diameter while working at a lower engine speed than would be required by an engine of conventional design. This is accomplished by the extra length of stroke obtained by the lever system interposed between power cylinder and crank shaft. It is universally conceded that reduction of engine speed is of great importance in engine design.

It is obvious that the proportion of excess stroke over the engine crank diameter may be varied by altering the distance of the pin $B^1$ or the pitch circle of the pinion $B^3$ from the center L of their oscillation.

In an engine of this type the additional piston travel may be utilized for other purposes than that of the direct development of power, but securing thereby advantages equivalent thereto. Let it be assumed that in an engine of relatively small diameter the piston stroke is twelve inches. The expansive force of the charge will exert pressure against the piston for a distance and time corresponding to the fall of temperature of the expanding charge, and this will insure power development to a point approximately beyond the middle of the stroke; that is, for a distance greater than six inches. The piston will, thereafter, travel by the momentum of the crank mechanism, absorbing power from it and acting as a braking, or retarding means, lowering engine speed. At a point in the long stroke a condition of partial vacuum will develop in the cylinder, which will tend to lower the temperature of the spent gases and, further, lead to an absorption of heat from the cylinder and piston walls. At the end of stroke, when the exhaust valve opens, atmospheric pressure will be restored in the cylinder and on the down stroke the incoming air will absorb the heat from the engine walls. In an engine of this kind part of the stroke of the piston would develop power, while the remainder would act as a means for removing heat. While the action was taking place this would involve a loss of power, but the cooling effect on walls and piston would raise the efficiency of the engine as a whole. The point of exhaust would also be near, at or below the atmospheric line, permitting the expansion of the power charge to any desired point or degree.

Figure 2:
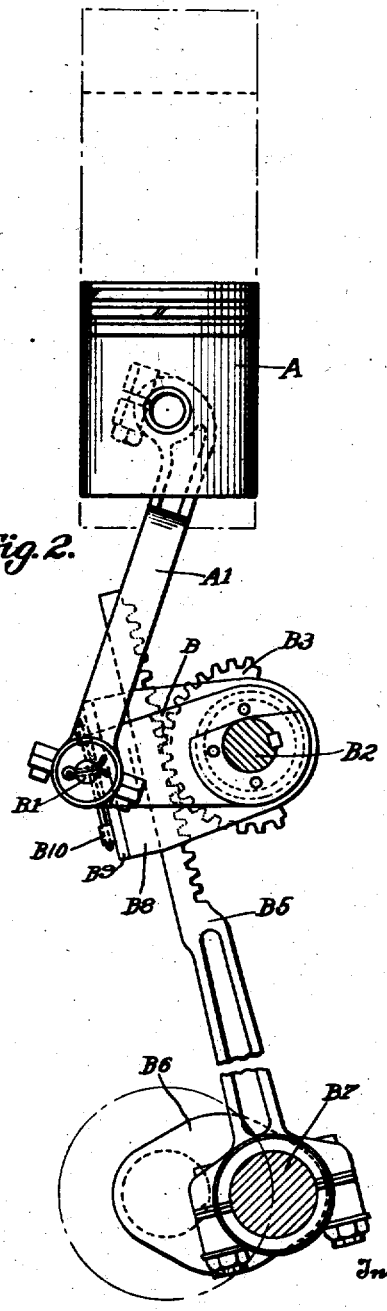
Figure 2 is the same at quarter stroke.

In Figure 11 I show a diagram of the operation of my differential principle in a two cycle engine. In Figure 5 the positions of the rack and the lateral positions of the piston rods $A^1$—$A^1$ are shown at extreme points of stroke. Figures 1, 2 and 3 show the positions of the variable stroke members through one revolution. Figure 7 shows the same structure as Figures 1, 2 and 3 except that the length of lever arm B is considerably greater than the diameter of the pitch circle of the pinion $B^3$.

In Figure 12 I show a novel arrangement of my transmitting members, by means of which I am able to place the center of the crank shaft outside the axis extended of the piston without altering movement or lowering efficiency.

A modification of my transmitting members is shown in Figures 16, 17 and 18. In this structure I dispense with slide arm $B^8$ using instead, a guide in the nature of a yoke, C, arranged to press against a loose collar on the pin $B^2$. As the segmental pinion $B^3$ tends to force the rack away, the surface of C, pressing against the collar on $B^2$, holds it in proper alignment with reference to the movement of the connecting rod $B^5$. In this construction I employ, preferably, two racks and two segmental pinions, the guide C moving between, as shown in the vertical elevation, Figures 19 and 20, the latter being a sectional view. The guide C is attached to the connecting rod $B^5$ by means of tap bolts, as shown at $C^1$, $C^1$.

In Figures 21, 22, 23, I show a further modification of my transmitting members. In this, I follow the construction given in Figures 16, 17, and 18, but in addition thereto I use grooves, D, forming part of the piston rod $D^1$, and make this rod rigid, in the position shown. The reciprocating action of the piston causes this rod to press on the rollers $D^2$ and gives motion to the lever cranks B—B.

In Figure 25 I show an application of my invention to the steam engine of a locomotive. Figures 29 and 30 are diagrams indicating the variation of cylinder proportions required to adapt my invention to such an engine. As the travel of the piston exceeds that of the crank, I lengthen the cylinder in order to be able to effect a proper cut-off of the steam. By reducing the diameter of the steam cylinder and increasing its length I maintain the same area by changing the volume.

It is evident that many forms of my invention may be made, and that the proportions of leverage to stroke can be changed to meet various conditions. I do not limit myself to the exact forms of the invention shown in this application.

What I claim to be novel, and ask to have protected by Letters Patent is:

1. In a transmission member, the combination of a cylinder, a piston in said cylinder, a lever pivoted in relation to said cylinder and a rod directly connected with said piston and lever, a pinion operatively connected with said lever so as to move in unison therewith, and having a pitch radius different from the length of said lever, a rack engaging said pinion, a pivoted movable guide for holding said rack in engagement with said pinion and a power shaft rotatable by the movement of said rack.

2. In a transmission member, the combination of a cylinder, a piston in said cylinder, a lever pivoted in relation to said cylinder, means for connecting said piston to said lever, a pinion having a pitch radius different from the length of said lever, means for moving the lever and pinion synchronously, a rack engaging said pinion, a pivoted slidable guide for holding the rack in engagement with said pinion and a power shaft rotatable by the movement of said rack, substantially as described.

3. In a transmission member, the combination of a cylinder, a piston in said cylinder, a lever pivoted in relation to said cylinder, a rod connecting said piston and lever, means for connecting said rod to said piston, a pinion of a different radius from the length of said lever, means for moving the pinion and lever synchronously, a rack engaging said pinion, a pivoted slidable guide for holding the rack in engagement with said pinion, a crank connecting rod forming part of said rack, and a power shaft rotatable by action of said crank, substantially as described.

4. In a power transmission member, the combination of a cylinder, a piston in said cylinder, a rod grooved at its lower end and rigidly attached to said piston, a lever pivoted in relation to said piston and rod, a roller on said lever fitting in the groove of said rod, a pin supported in the frame of said power transmission member, a pinion pivoted on said pin, a rack engaging the teeth of said pinion, means for holding said rack in engagement with said pinion, a crank connecting rod forming part of said rack, and a crank that imparts the motion of said rack to a power shaft, substantially as described.

5. In a transmission for engines, a cylinder, a piston slidable within said cylinder, a pin, a lever and a pinion mounted on said pin and operatively connected together so as to move in unison, a connecting rod operatively connecting said piston and lever, a crank, a racked connecting bar adapted to mesh with said pinion and having its opposite end connected with said crank, oscillating means pivoted on said pin and adapted to hold said racked connecting bar in mesh with said pinion.

6. In a power transmission, a piston, a reciprocating power means directly connected with said piston, a driven crank, a pin, a lever mounted on said pin and operatively connected with said reciprocating means, a connecting rod, means operatively connecting said lever and connecting rod whereby the movement of the reciprocating member is equal to twice the length of the lever multiplied by the cosine of an angle equal to (90° minus a fraction whose numerator is the diameter of the crank circle multiplied by 90°, and whose denominator is $\pi$ times the radius of the last mentioned means).

7. In a transmission member, the combination of a cylinder, a piston in said cylinder, a lever pivoted in relation to said cylinder, a rod extending from said piston to said lever, means for connecting said rod to said piston, a pinion of a different radius from the length of said lever, means operatively connecting the lever and pinion, a rack, an oscillating guide for retaining the rack in engagement with said pinion, a crank connecting rod integral with said rack, and a power shaft rotatable by the action of said crank, substantially as described.

8. In combination, a piston, and an oscillating lever and pinion, moving in unison and driven by the piston, a crank, a racked connecting rod meshing with the pinion and connected with the crank whereby the piston stroke is equal to twice the length of the lever multiplied by the cosine of an angle equal to (ninety degrees minus a fraction whose numerator is the diameter of the crank circle multiplied by ninety degrees and whose denominator is $\pi$ times the radius of the pinion).

9. In combination, a piston, an oscillating lever and pinion, moving in unison and driven by the piston, a crank, a racked connecting rod meshing with the pinion and connected with the crank whereby twice the product of the ratio of the short to the long arm of the lever by the crank throw, all divided by the piston stroke equals half the angle of oscillation divided by half the sine of said angle of oscillation.

In testimony whereof I affix my signature.

ALVAH L. POWELL.